June 20, 1967 — C. E. SCHROEDER, JR — 3,325,999

FACILITY FOR STORING LIQUIDS AT LOW TEMPERATURES

Filed Dec. 7, 1964

INVENTOR.
CARL E. SCHROEDER JR.
BY
ATTORNEY

United States Patent Office 3,325,999
Patented June 20, 1967

3,325,999
FACILITY FOR STORING LIQUIDS AT LOW TEMPERATURES
Carl E. Schroeder, Jr., Ponca City, Okla., assignor to Continental Oil Company, Ponca City, Okla., a corporation of Delaware
Filed Dec. 7, 1964, Ser. No. 416,472
18 Claims. (Cl. 61—.5)

This invention relates to storage facilities for storing liquids having a relatively high vapor pressure at relatively low temperatures. More particularly, the present invention relates to an earthen storage cavity formed by excavating the earth, said cavity and certain novel associated structure being adapted for economically storing liquids at a relatively low temperature. A yet more specific aspect of the invention relates to an improved bottom seal structure for sealing vertical walls or partitions in the earth as such partitions are used in an earthen, multi-compartment storage facility for liquids.

Numerous investigations have recently been made relative to the possibility of effectively storing liquids at relatively low temperatures in earthen storage facilities. It has been proposed to construct such facilities by excavating the earth to form a suitable cavity for retaining such liquids, and then rendering the earthen walls of the cavity substantially impermeable to the stored liquids by impregnating the walls with moisture and freezing the moisture to a solid state. The water-impregnated earthen walls are maintained in the frozen condition during the period of storage by the low temperature of the cryogen or other cold liquid material retained in the cavity.

Earthen storage facilities of the type described have the great advantage over tanks and other above ground storage containers of being much more economical to construct, and of being practically unlimited in capacity. One condition which is associated with subterranean storage of cryogens, such as liquified natural gas and the like, which has not been optimized to the present time, however, is the rate of heat exchange between the earth surrounding and forming the walls of the storage cavity with the liquid material which is stored therein. At very low temperatures of storage, such as are required in the case of liquified natural gas or liquified nitrogen, the heat transfer from the earth to the stored liquid is quite rapid, and expensive apparatus, such as compressors and other recovery equipment, must be provided to prevent excessive losses due to boil-off or vaporization of the stored material.

The present invention provides an improved earthen storage facility for storing liquids at very low temperatures over extended periods of time. Broadly described, the invention comprises an earthen cavity having a side wall and a bottom and having at least one partition within the cavity dividing it into a plurality of isolated or segregated chambers. The bottom edge of each of the partitions rests in an annular groove or trench formed in the earth at the bottom of the excavation. Each of the annular grooves is at least partially filled with ice which is maintained in its frozen solid state by contact with the cryogens or low temperature liquids stored therein, and thus forms a solid, impermeable seal and mechanically stable footing for the several cylindrical partitions. Preferably, a plurality of concentric cylindrical partitions are positioned in the cavity to form a plurality of concentric chambers therein.

The liquids which can be stored in the storage facility of the invention are substantially any liquid which is not corrosive to metal and has a melting point lower than that of water. The preferred use of the invention involves the storage of normally gaseous materials at cryogenic temperatures, and the advantage of the multipartition arrangement is that a plurality of liquids varying boiling points can be stored in the facility so that minimum vapor loss of the stored materials occurs as a result of heat exchange between the stored materials and the surrounding earth. To accomplish this, the lowest boiling material is stored in the most centrally located of the concentric, cylindrical chambers, and the other liquids are stored in the surrounding, concentric, cylindrical chambers in the order of their boiling points, with the lower boiling materials disposed radially inwardly in the facility, and the higher boiling materials disposed radially outwardly therein. The heat exchange between the external or boundary liquid at the outside of the facility and the earthen walls which define the storage cavity is thus minimized, as is the heat exchange between adjacent bodies of the several liquids.

An important feature of the invention is the footing structure for the several concentric walls or partitions of the storage facility. The footing structure is formed by the ice which fills the grooves in the earth into which the partitions extend. In constructing the footing structure for the partitions in this manner, a solid, structurally strong base is formed for each partition and retains the respective partition in its correct position relative to the other partitions, as well as providing vertical support for the partition. Moreover, by virtue of the unique property of water in expanding when it is frozen, a tight seal is formed around the lower edge of the partition and against the surrounding earth so that seepage under the partition is substantially reduced or eliminated. Also, prior to being solidified by freezing, water introduced to the footing grooves saturates the surrounding soil, thereby improving the integrity of the bottom seal for the cavity when the moisture in the surrounding soil is frozen, and further mechanically reinforcing the footing structure by the extension of the ice block into the soil immediately surrounding the footing grooves.

The employment of ice in the grooves to seal around, and mechanically support, the partitions presents the further advantage with respect to other materials, such as asphalt and concrete, of retaining a high mechanical strength at extremely low or cryogenic temperatures rather than becoming extremely brittle and developing cracks which would destroy the integrity of the seal around the lower edges of the partitions. Although some cracking may develop in the ice, the self-healing property of ice quickly seals any small fissures or cracks which may develop. Not the least of the advantages of the described footing structure is the ease with which the footing may be initially formed or, alternatively, may be removed or destroyed when use of the storage facility is completed and it is desired to remove the concentric partitions from the earthen excavation. Thus, the water can be very easily introduced to the annular grooves in the bottom of the excavation preparatory to freezing the water prior to introduction at very low temperatures of the material to be stored to the cavity. Alternatively, mere removal of the stored material from the cavity will permit the water to return to the liquid state and thereby permit the concentric cylindrical partions to be easily lifted upwardly out of the cavity.

From the foregoing description of the invention, it will have become apparent that it is a major object of the present invention to provide an improved storage facility for storing liquids at relatively low temperatures.

An additional and more specific object of the present invention is to provide a subterranean storage facility for economically storing liquids at cryogenic or other relatively low temperatures in a manner which reduces the rate of heat exchange between the stored liquids and the earthen environment of the storage facility.

Another object of the invention is to provide an improved footing structure for vertical walls or partitions used in constructing a multichambered underground storage facility for liquids.

Yet another object of the present invention is to provide a relatively inexpensive, mechanically strong underground storage facility in which a plurality of liquids can be simultaneously stored at relatively low temperatures.

An additional object of the present invention is to provide a multichambered, underground liquid storage facility which can be very quickly assembled and disassembled with no loss or destruction of materials occurring during the procedure of disassembly.

In addition to the foregoing described objects and advantages of the invention, other objects and advantages will be specifically mentioned in, or can be easily inferred from, the following detailed discussion of the invention, and from the accompanying drawings which illustrate one embodiment of the invention.

Figure 1:
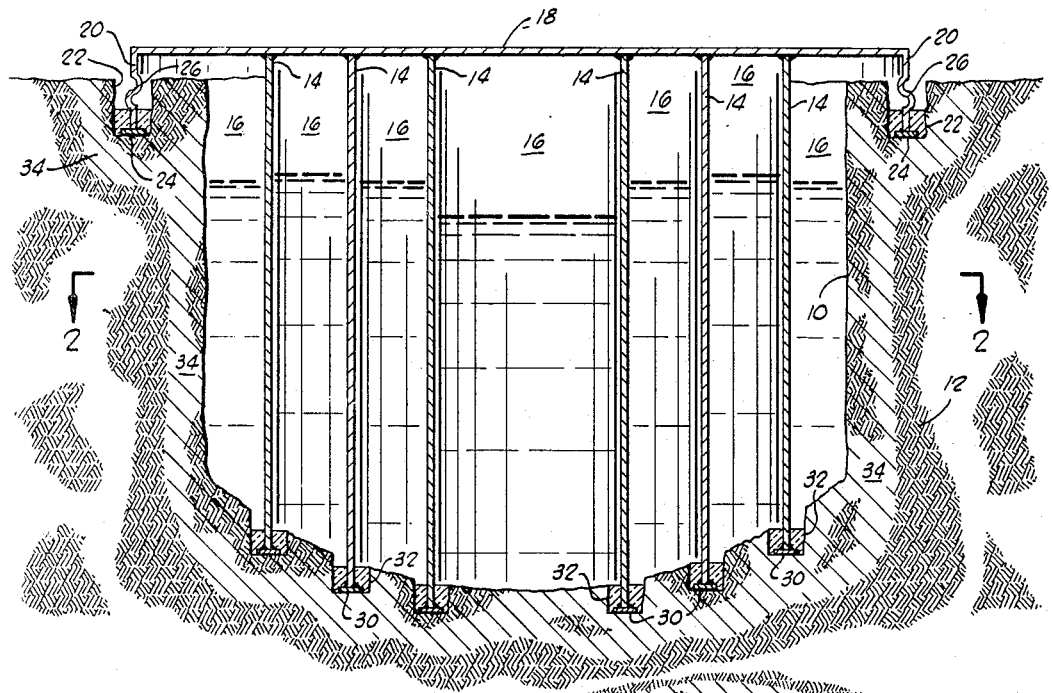
FIGURE 1 is a vertical sectional view taken through the center of a storage facility constructed in accordance with the present invention.
Figure 2:
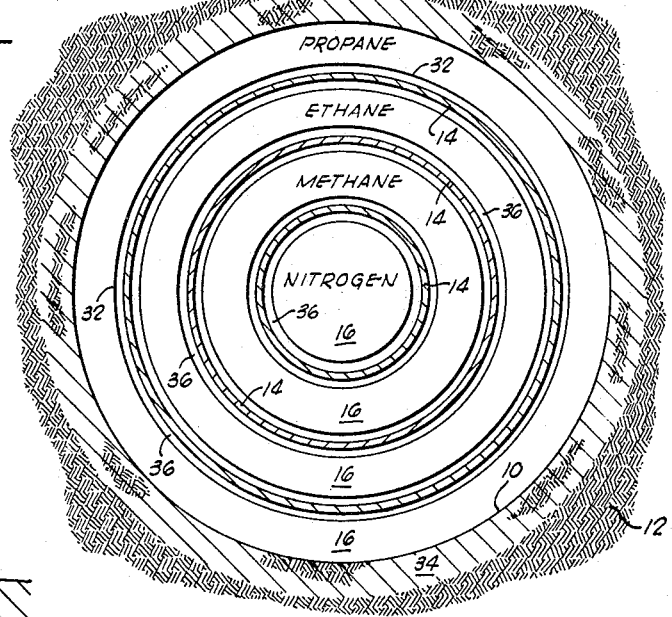
FIGURE 2 is a horizontal sectional view taken transversely through the storage facility illustrated in FIGURE 1.
Figure 3:
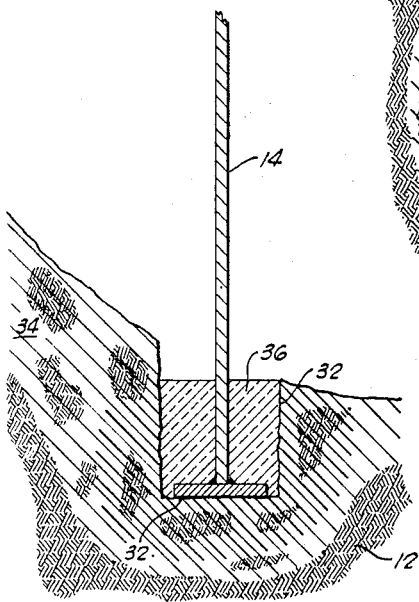
FIGURE 3 is a detailed sectional view of the footing structure utilized in the storage facility of the present invention.

Referring now to the drawings in detail, and particularly to FIGURE 1, a large, generally cyindrical excavation 10 is formed in the earth 12 for the accommodation of the liquids which are to be stored. Disposed within the cavity 10 are a plurality of vertically extending, concentrically disposed generally cylindrical metal walls or partitions 14. As will be perceived in referring to FIGURES 1 and 2, the cylindrical partitions 14 define a plurality of concentric chambers 16 which are adapted to contain segregated quantities of a plurality of liquids which extend to the same or different levels in the several chambers.

The cylindrical partitions 14 are welded or otherwise suitably secured at their upper ends to a generally horizontally extending roof structure 18 which extends across or bridges the cavity 10. At the outer periphery of the roof structure 18, a downwardy depending circumferential flange 20 is formed, and is extended into an annular groove or trough 22 formed in the surface of the ground and extending around the cavity 10. The flange 20 is secured at its lower end to a horizontal bed plate 24 which rests on the bottom of the trough 22. A crimped or corrugated section 26 is provided in the flange 20 to permit expansion or contraction of the roof structure 18 without fracturing or other structural damage.

At their respective lower ends, each of the cylindrical partitions 14 is welded or otherwise suitably secured to an annular foot plate 30 which rests upon the bottom of an annular groove or trough 32 formed in the bottom of the cavity 10. The troughs 32 are preferably of generally rectangular cross-sectional configuration and extend into the earth in the bottom of the cavity 10 for a sufficient distance to permit footings for the cylindrical partitions 14 to be constructed having the necessary structural strength as hereinafter described.

In the construction of the storage facility of the invention, the concentric cylindrical partitions 14 are positioned in the cavity 10 in the manner described, and the troughs 32 in the bottom of the cavity, as well as the trough 22 in the earth around the top of the cavity, are filled with water. Introduction of water into the troughs is continued so as to maintain a substantial depth of water in each of the troughs despite seepage of some of the water into the surrounding earth. In the case of the storage of some types of liquids, refrigeration pipes or other suitable heat exchange means are next used to freeze the interstitial water in the earth surrounding the cavity 10 so as to form relatively impermeable cavity walls composed of earth containing ice in the interstices thereof. This section of frozen earth surrounding the cavity is designated by reference character 34 in the drawings. When this procedure is followed, the water in the troughs 32 and 22 will also be frozen to form ice as indicated at 36.

In being converted from the liquid to the solid state, the water in the troughs expands and forms a tight impermeable seal around the lower ends and foot plates 30 of the cylindrical partitions 14, and also around the lower end and bed plate 24 of the downwardly depending flange 20 of the roof structure 18. The incasement of the lower ends of these structural members in the ice formed in their respective troughs provides a stable and mechanically strongly footing structure, particularly since the ice in the troughs is integrated and mechanically interconnected with ice in the interstices of the earth surrounding the grooves. In the process of expansion of the water during freezing, another desirable result which occurs is the compaction of the earth surrounding the troughs to provide a more stable reinforcement for the footing structure, and an improvement in the impermeability of the bottom of the cavity. After the water in the troughs 32 and 22 has been frozen, and the interstitial water in the earth surrounding the cavity has also been converted to ice, the several chambers or compartments 16 of the storage facility are filled with various liquids which are to be stored at a temperature lower than the melting point of ice.

The greatest utility of the invention is in the storage of normally gaseous materials in a liquid state and at cryogenic temperatures. To the end of reducing to a maximum extent the problems engendered by heat exchange between the stored liquid and the relatively warmer earthen walls of the cavity 10, the present invention makes use of the employment of the plurality of concentric chambers 16 to permit the containment of several liquids of graduated boiling points. Thus, in the example illustrated in the drawings, a relatively low boiling material, such as liquified nitrogen, can be contained in the most centrally located chamber 16 and a relatively high boiling liquid, such as liquified propane, can be contained in the outermost chamber which is defined by the radially outermost partition 14 and the earthen walls of the cavity 10. In the intermediate concentric chambers 16, liquids whose boiling points are intermediate those of the centrally located liquid and the outermost liquid are stored. In the example depicted in the drawings, these may be liquified methane and liquified ethane. The advantage of the described arrangement is to prevent excessive loss of the low boiling nitrogen retained in the central chamber 16 of the storage facility through vaporization as a result of rapid heat exchange with the earth surrounding the cavity. In other words, in positioning the relatively higher boiling propane in the outermost chamber 16, less heat exchange occurs with the surrounding earth, and volatilization of the propane occurs relatively less rapidly than would volatilization of the other stored liquid materials if they were placed in the outer chamber.

Another advantage of the depicted concentric chamber arrangement is the reinforcement which is provided to each of the cylindrical partitions 14 by the liquid contained in adjacent chambers. Thus, when all of the chambers 16 are to be filled to substantially the same level with liquids to be stored at relatively low temperatures, the partitions 14 can be made relatively thin.

As an alternative to constructing the storage facility in the manner previously described, the cavity 10 may be formed in the earth and the concentric cylindrical partitions 14 then placed in position in the arrangement illustrated in FIGURE 1. The troughs 32 and 22 are then filled with water as previously described, but the earth surrounding the cavity 10 and the water in the troughs are not frozen prior to placing the liquids to be stored in the storage facility. The liquids which are to be stored are then formed by condensation of their respective gases by lowering the temperature of the gases, and are placed in their respective chambers 16. It is contemplated that hydrocarbons or other liquids which are substantially immiscible with water will be the materials to be stored when this method of forming the storage facility is utilized. Thus, as the very low temperature liquids are placed in their respective chambers 16, little or no mixing with the water in the troughs 32 will occur and the water will be frozen by contact with the stored liquids. Concurrently, the interstitial water in the earth surrounding the cavity 10 is frozen to render the walls of the cavity substantially impermeable to the stored liquid. The water in the trough 22 in the earth around the top of the cavity 10 will also be frozen in most instances, but if the temperature of the stored materials is not sufficiently low to effect the conversion of the liquid in this trough to ice, this can be accomplished with appropriate refrigeration equipment.

When it is desired to terminate the liquid storage and disassemble the storage facility, the liquids may be removed from the chambers 16 and the temperature of the earth surrounding the cavity 10 permitted to rise to a level such that the ice in the troughs 32 and 22 melts. It is then a simple matter to remove the entire metallic structure including the concentric cylindrical partitions 14 and the roof structure 18 from the cavity and transport it to another location for re-use, or to disconnect the partitions 14 from the roof structure 18 for use in other applications at a later time.

From the foregoing description, it will be apparent that the present invention provides a highly useful, very effective facility for storing, without excessive loss due to vaporization, a plurality of liquids at cryogenic or very low temperatures. The foot structures formed by the earthen troughs containing ice which surrounds the lower end of the concentric partitions used in the storage facility are mechanically strong and can be very quickly and economically constructed. The seals provided around the lower ends of the partitions maintain their integrity over the entire duration of the storage period due to the self-healing property of ice which prevents the development of cracks or fissures through the seal, and the integration of the relatively pure ice in the grooves with the frozen moisture in the surrounding soil assures that no shifting or movement of the structure can occur. Moreover, where hydrocarbon liquids are to be stored, as in the preferred utilization of the storage facility, the employment of water for the formation of the seal structures around the lower ends of the partitions reduces or eliminates contamination of the stored liquids by virtue of the immiscibility of water with the stored liquids.

Although a preferred embodiment of the invention has been hereinbefore described as exemplary of its practice, it will be understood that various innovations and modifications can be made in the described structure without departure from the principles which underlie the invention. For example, walls 14 may be formed in a continuous spiral with chambers 16 being isolated from each other by suitable radial bulkheads affixed between adjacent portions of the spiraled member. Moreover, suitable freezing and heating conduits may be incorporated into troughs 32 so that the water therein may be frozen or melted without reference to the temperature of the surrounding area, or dry ice may be used to initially freeze the water. In addition, means, such as valves or gates, may be provided between adjacent chambers 16 to allow flexibility in the utility of this structure, while, if desired, walls 14 may include insulation to minimize heat leak within the structure. These and other modifications and innovations are deemed to be circumscribed by the spirit and scope of the invention except as the same may be necessarily limited by the appended claims or reasonable equivalents thereof.

I claim:
1. A facility for containing liquids at low temperatures comprising:
   an earthen cavity having side walls and a bottom, said bottom having at least one trough formed therein to divide the bottom of the cavity into at least two areas, each separated completely from the other areas by at least one of the troughs;
   at least one vertically extending partition in said cavity and extending into one of said troughs, said partition forming a common wall of two separated chambers within said cavity; and
   ice sealing said partitions in the respective troughs into which they extend.

2. A facility for storing liquids at low temperatures comprising:
   an earthen cavity having a plurality of troughs formed in the bottom thereof, said troughs enclosing between each other, and between themselves and the intersection of the bottom of the cavity with the walls thereof, a plurality of areas constituting bottoms for chambers in said cavity;
   a plurality of vertically extending partitions in said cavity forming walls for said chambers and each having a lower edge positioned in one of said troughs; and
   ice at least partially filling said troughs and sealingly surrounding the lower edges of the partitions.

3. A facility for containing liquids as defined in claim 2 and further characterized as including roof structure bridging across said cavity.

4. A facility as defined in claim 3 wherein said roof structure is connected to the upper ends of said vertically extending partitions.

5. A facility as defined in claim 2 and further characterized to include means interconnecting the upper ends of said partitions to provide mechanical support for said partitions in cooperation with said ice.

6. A facility as defined in claim 3 and further characterized as including a trough extending around the top of said earthen cavity on the outside thereof;
   a peripheral edge portion on said roof structure extending into said trough; and
   an ice seal in said trough and sealingly engaging the peripheral edge portion of said roof structure.

7. A facility for storing liquids at temperatures below the freezing point of water comprising:
   a earthen cavity having a generally cylindrical side wall and a bottom;
   trough means in the bottom of said cavity and occupying a substantially horizontal plane to permit containment of water;
   at least one partition in said cavity and having a lower edge positioned in said trough means, said partition extending between the side wall of the cavity and the bottom thereof to each form a common wall of two separated chambers within said cavity; and
   ice in said trough means and forming a seal between the lower edge of said partition and the bottom of said cavity whereby liquids contained in said chambers cannot pass under said partition into the adjacent chamber.

8. A facility as defined in claim 7 wherein the side wall and bottom of said cavity are substantially liquid impermeable.

9. A facility as defined in claim 8 wherein the side wall and bottom of said cavity are formed of frozen, substantially liquid impermeable earth.

10. A facility as defined in claim 7 wherein a plurality of concentric, cylindrical partitions are positioned in said cavity to define within the cavity a plurality of concentric chambers greater in number by one than the number of cylindrical partitions; and
   wherein said trough means includes an annular trough receiving the lower edge of each of said cylindrical partitions.

11. A facility as defined in claim 7 wherein said separated chambers are each open at the top, and being further characterized is including a roof structure covering said chambers.

12. A facility as defined in claim 7 and being further characterized as including means for liquid containment encircling the top of said cavity on the outside thereof; and
    a roof structure bridging said cavity and extending at its outer periphery into said means for liquid containment.

13. A facility as defined in claim 12 wherein said roof structure is connected to the upper ends of said partitions.

14. A facility as defined in claim 13 wherein said roof structure includes a horizontally extending main roof portion secured to said partitions; and
    a downwardly depending flange extending into said liquid containment means.

15. A facility as defined in claim 14 wherein said flange is corrugated to facilitate expansion and contraction of said roof structure.

16. A facility as defined in claim 12 and further characterized as including ice positioned in said liquid containment means and sealingly engaging the outer periphery of said roof structure.

17. A structure for containing liquids in the earth at reduced temperatures comprising:
    an earthen cavity having a substantially liquid impermeable, generally cylindrical earthen side wall containing interstititial ice, and further having a substantially liquid impermeable earthen bottom containing interstitial ice, said bottom having formed therein a plurality of concentric annular grooves;
    a plurality of concentric, generally cylindrical, vertically extending partitions positioned in said cavity and each having a lower edge portion extending into one of said annular grooves, the radially outermost of said concentric cylindrical partitions being spaced radially inwardly from said side wall;
    ice in said annular grooves and sealingly engaging the lower edge portion of the respective partitions to prevent liquid seepage under said partitions;
    a roof structure extending across said cavity and sealingly connected to the upper ends of each of said vertically extending partitions; and
    means forming a seal between the outer periphery of said roof structure and the earth surrounding and outside said cavity to prevent the escape of fluid from said cavity.

18. A structure as defined in claim 17 and further characterized as including an annular foot plate resting on the bottom of each of said annular grooves and secured to the lower edge portion of the respective partition for supporting said partition on the bottom of said cavity in the respective groove.

References Cited

UNITED STATES PATENTS

| | | | |
|---|---|---|---|
| 962,710 | 6/1910 | Levin | 220—9 |
| 1,100,081 | 6/1914 | Kramer. | |
| 1,252,547 | 1/1918 | Calthrop et al. | 61—.5 X |
| 1,765,946 | 6/1930 | Shea | 220—13 |
| 3,047,184 | 7/1962 | Bergen et al. | |
| 3,175,370 | 3/1965 | Schlumberger et al. | 61—.5 X |
| 3,205,665 | 9/1965 | Van Horn | 61—.5 |

FOREIGN PATENTS

| | | |
|---|---|---|
| 1,037,086 | 4/1953 | France. |
| 921,844 | 3/1963 | Great Britain. |
| 929,767 | 6/1963 | Great Britain. |

EARL J. WITMER, *Primary Examiner.*